United States Patent
Stougaard

[15] 3,635,133
[45] Jan. 18, 1972

[54] MOUNTING FOR COMPACTORS
[72] Inventor: Chris Stougaard, Racine, Wis.
[73] Assignee: Racine Federated Industries Corporation, Racine, Wis.
[22] Filed: Oct. 29, 1969
[21] Appl. No.: 872,046

[52] U.S. Cl. ............................................94/49, 173/44
[51] Int. Cl. ..........................................E01c 19/30
[58] Field of Search ...........................94/48, 49; 173/44

[56] References Cited

UNITED STATES PATENTS

| | | | |
|---|---|---|---|
| 3,109,353 | 11/1963 | Ulrich | 94/46 |
| 3,128,682 | 4/1964 | Thompson | 94/48 |
| 3,497,017 | 2/1970 | Goettl | 94/48 X |

Primary Examiner—Jacob L. Nackenoff
Attorney—Hofgren, Wegner, Allen, Stellman & McCord

[57] ABSTRACT

A device for mounting a material compactor on a vehicle including means for securing the mounting device to the vehicle, a baseplate including an adjustable connection to the vehicle securing means, a pair of linkage arms pivotally mounted to the baseplate to allow conformation of the compactor to ground level, upper and lower spaced pairs of connecting arms having one end pivotally joined to the linkage arms and the other end pivotally connected to the material compactor to allow vertical compactor to allow vertical compactor movement without substantially transmitting reaction to the retaining vehicle, means for adjusting the compactor angle, shock-absorbing means on the baseplate to cushion blows of the connecting arms, and means to lock the connecting arms in an elevated position for vehicle movement with the compactor suspended above ground level.

10 Claims, 4 Drawing Figures

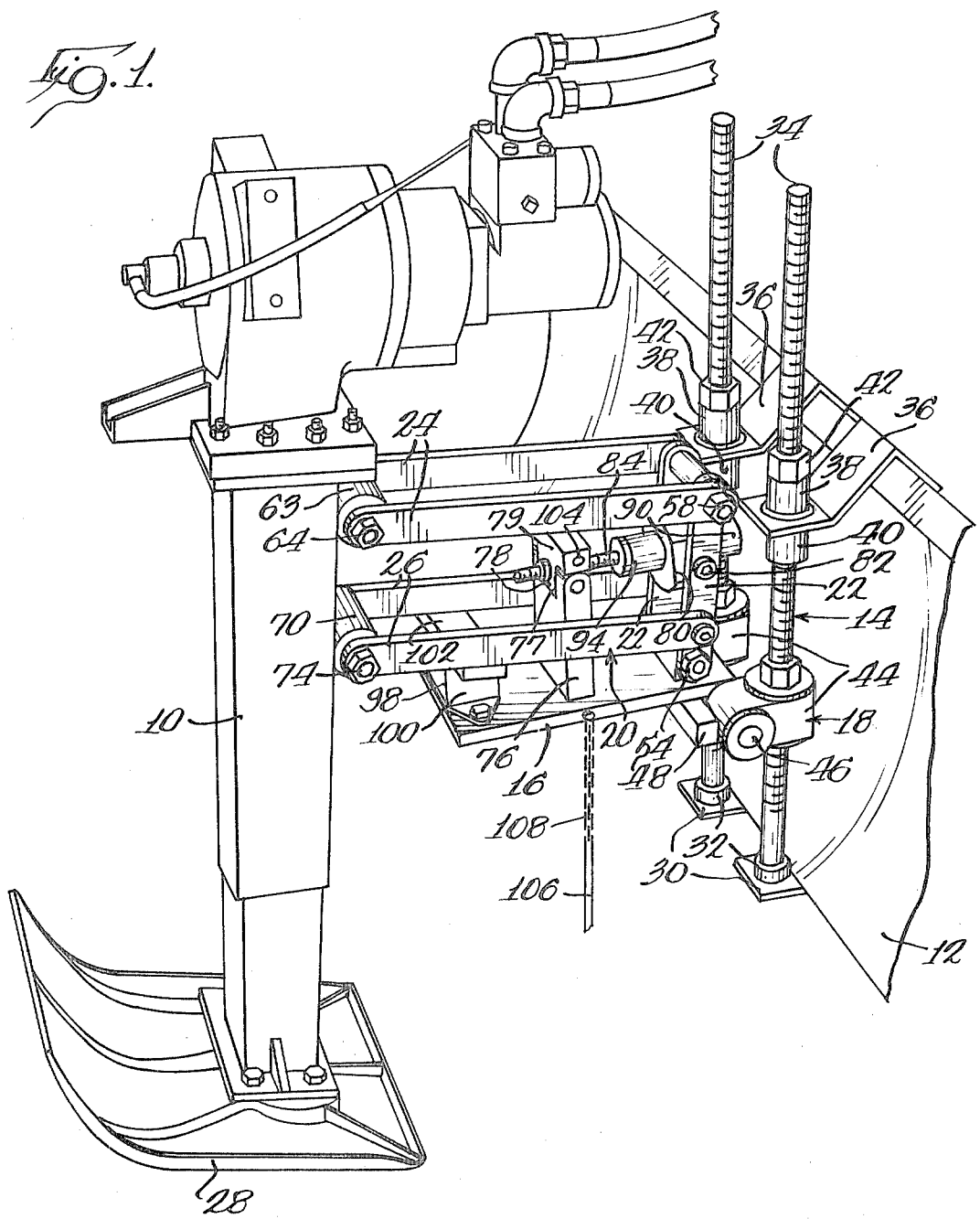

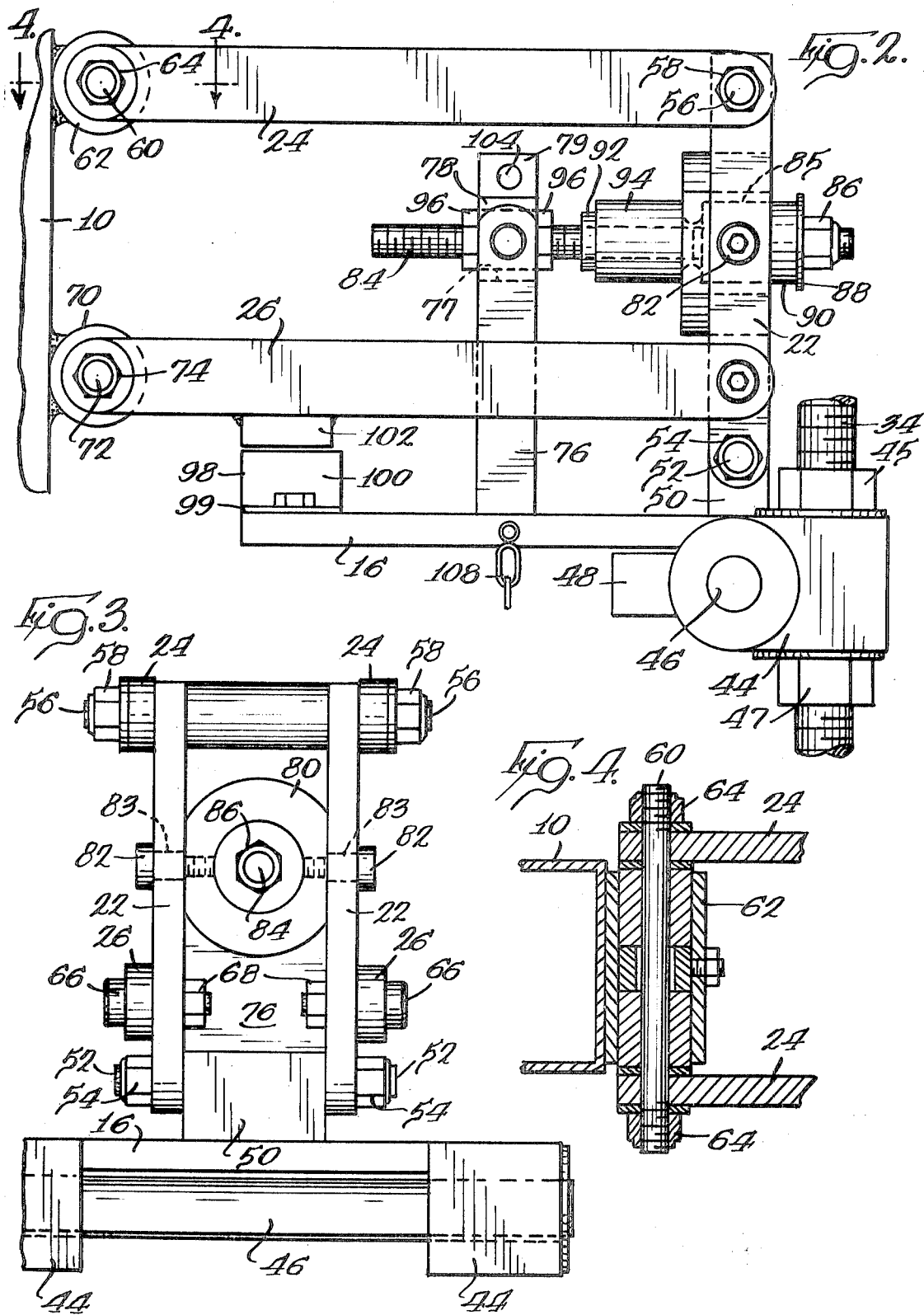

MOUNTING FOR COMPACTORS

BACKGROUND OF THE INVENTION

This invention relates to a mounting device for securing a material compactor to a vehicle.

A number of problems have been met for mounting material compactors on vehicles. Heretofore, the resulting apparatus has not proved to be totally satisfactory in that the means by which the compactors were mounted on the vehicles caused substantial transposition of compactor reaction to the vehicle. Additionally, because such devices are continually used on terrain of a varied nature, often times problems were encountered with adjustment of the compactor to abrupt changes in the terrain which the vehicle would be traversing. As a result, compactors were subjected to excessive wear and poor operating conditions.

SUMMARY OF THE INVENTION

It is the principal object of the present invention to provide new and improved means for securing a material compactor to a vehicle whereby transmission of compactor reaction to the vehicle is avoided.

The mounting device of this invention includes means for securing the device to a vehicle and connected to the securing means is a baseplate pivotally mounting a pair of linkage arms. A compactor is connected to the linkage arms by spaced upper and lower pairs of connecting arms having one end pivotally connected to the linkage arms and the other end pivotally joined to the compactor. The pivotal connection of the linkage arms to the baseplate allows conformation of the compactor to ground level.

Modification of the compactor attitude is accommodated by means of an adjustable connection between an adapter rod and an adapter plate, the adapter rod extending from the adapter plate which is mounted on the baseplate to a retaining joint pivotally connected to the linkage arms intermediate their ends.

In order to absorb shock at the linkage arms, a cushion is located in the retaining joint and by shock-absorbing means mounted on the base plate, shock transmission from the connecting arms is minimized.

Other features include a means for selectively maintaining the material compactor in an elevated position with respect to the vehicle by means of a lockpin engageable with the connecting arms to maintain the latter in an ascending configuration. When the invention is to be used with a vehicle such as a dozer, the securing means preferably includes a lower pair of clamp elements mounted on a pair of holding rods and an upper pair of clamp elements adjustable on the holding rods and adapted to grasp the bottom and top edges respective of a blade.

When securing means, such as those set forth in the preceding paragraph, are utilized, the invention may further include means for permitting vertical adjustment of the compactor by permitting adjustment of the same relative to the securing means. Specifically, the baseplate may be adjustably connected to the securing means by means of a pair of bores in which the holding rods are received together with locking means for selectively locking the baseplate in any desired position of vertical adjustment.

Further objects will become more fully apparent in the following description of the embodiments of this invention and from the appended claims.

DESCRIPTION OF THE DRAWINGS

In the drawings:

FIG. 1 is a perspective view of one embodiment of a mounting means and compactor made according to the present invention;

FIG. 2 is a fragmentary side elevation of the mounting means and compactor;

FIG. 3 is a fragmentary side elevation of a baseplate and linkage arms; and

FIG. 4 is a fragmentary horizontal section taken approximately along the line 4—4 in FIG. 2.

DESCRIPTION OF THE PREFERRED EMBODIMENT

Referring now to FIG. 1, an exemplary embodiment of the invention is seen to comprise a device for mounting a material compactor 10 to a dozer blade 12 of a retaining vehicle (not shown). The mounting device includes securing means, generally designated 14, for securing the same to the dozer blade 12 including an adjustable baseplate connection, generally designated 18, and a frame assembly, generally designated 20. The frame assembly 20 includes a pair of upright spaced-apart linkage arms 22 pivotally connected to the baseplate 16 adjacent the baseplate connection 18, an upper pair of parallel spaced-apart connecting arms 24 each having one end pivotally connected to the adjacent upper ends of the linkage arms 22 and the other ends pivotally joined to the material compactor 10. A lower pair of parallel spaced-apart connecting arms 26 are mounted to extend substantially parallel to the upper connecting arms 24. Each has one end pivotally connected to the linkage arms 22 adjacent the pivotal connection of the linkage arms 22 to the baseplate 16 and its other end pivotally joined to the compactor 10.

The upper and lower connecting arms 24 and 26, and the linkage arms 22 form with the compactor 10 a parallelogram linkage pivotally connected to the baseplate 16 to maintain the compactor 10 at a predetermined attitude with respect to the vehicle and thus with respect to the ground on which the vehicle may travel, and to permit movement of the compactor with respect to the vehicle to accommodate changes in the terrain over which the vehicle may travel.

The material compactor 10 is designed to cause vertical vibration of a ground-engaging compactor blade 28 for tamping soil. In this invention, the vertical vibrations of the compactor 10 are substantially isolated from the dozer blade 12 by the pivotal structure of the frame assembly 20.

Considering now the securing means 14 in detail, a pair of lower clamp elements 30 is seen in FIG. 1 and include threaded sleeves 32 at one end adapted to screw onto the bottom ends of a pair of threaded holding rods 34. Elongated flanges (not shown) extend laterally from the threaded sleeves 32 of the lower clamp elements 30 and are formed to grasp the bottom edge of the dozer blade 12.

Above the lower clamp elements 30, the holding rods 34 support a pair of upper clamp elements 36 each having a bore (not shown) of a diameter slightly larger than the diameter of the holding rods 34 to allow movement of the upper clamp elements 36 along the holding rods 34. The upper clamp elements 36 extend outwardly from the holding rods 34 and are adapted to securely grasp the upper edge of the dozer blade 12. A pair of upper cylindrical sleeves 38 and a pair of lower cylindrical sleeves 40 are secured to the upper clamp elements 36 as by welding and guide the clamp elements 36 on the rods 34. A pair of locknuts 42 securely hold the upper clamp elements 36 in position on the upper edge of the blade 12.

The design is such that the vertical position of the upper clamp elements 36 can be modified to accommodate different dozer blade heights through adjustment of the sleeves 38 and 40, and the locknuts 42.

The baseplate 16 is movably connected to the holding rods 34 and located intermediate the lower clamp elements 30 and the upper clamp elements 36 by means of a pair of baseplate connecting arms 44 (FIG. 2) each having a cylindrical bore (not shown) sufficiently large in diameter to allow free movement of the connecting arms 44 along the holding rods 34. Locknut pairs 45 and 47 hold the baseplate connecting arms 44 securely to the holding rods 34. The configuration is such that vertical adjustment of the baseplate connecting arms 44 along the holding rods 34 is allowed to vertically adjust the height of the material compactor as will be seen.

The baseplate 16 is pivotally connected to the baseplate connecting arms 44 by an interconnecting pin 46. Pivotal movement of the baseplate 16 about the axis of the pin 46 is substantially confined to above a horizontal plane by a laterally extending baseplate stop 48 which is connected to the baseplate connecting arms 44 below the baseplate 16 and which will engage the lower surface of the baseplate 16 when the same is in a substantially horizontal position.

Referring further to the frame assembly 20, the linkage arms 22 are pivotally connected to an anchor plate 50 mounted on the baseplate 16 adjacent the baseplate connecting arms 44, as illustrated in FIG. 3, by a pair of bolts 52 extending outwardly from the anchor plate 50 and having retaining nuts 54.

The upper pair of connecting arms 24 is pivotally connected to the linkage arms 22 by a pivot pin 56 as seen in FIG. 3. The pin 56 extends through aligned apertures in the upper ends of the linkage arms 22 and in the ends of the upper connecting arms 24, and terminates in outwardly extending threaded ends receiving retaining nuts 58.

The other ends of the connecting arms 24 are pivotally joined to the compactor 10 by a pivot pin 60 as illustrated in FIG. 4. The pin 60 is received in an apertured projection 62 on the compactor 10 and extends through aligned apertures in the ends of the upper connecting arms 24 terminating in outwardly extending threaded ends receiving retaining nuts 64.

The lower pair of connecting arms 26 is pivotally connected to the linkage arms 22 adjacent the pivotal connection of the linkage arms 22 to the anchor plate 50. As illustrated, a pair of bolts 66 extend inwardly through aligned apertures in the ends of the lower connecting arms 26, through aligned bores in the linkage arms 22, and terminate in threaded ends receiving retaining nuts 68.

The opposite ends of the lower connecting arms 26 are pivotally joined to a bored projection 70 on the material compactor 10 by a pivot pin and nuts 74 in a similar fashion to the connection of the upper connecting arms 24 to the material compactor 10.

As best seen in FIG. 1, an adapter plate 76 is fixed to and extends upwardly from the middle of the baseplate 16 and a recess 77 in the upper end of the adapter plate 76 receives the tongue 78 of a T-shaped member 79. The tongue 78 of the T-shaped member 79 is pivotally pinned to the sides of the adapter plate at either side of the recess 77.

As illustrated in FIGS. 2 and 3, a central retaining block 80 is pivotally connected to the linkage arms 22 intermediate the upper and lower connecting arms 24 and 26. The pivotal connection is made by a pair of bolts 82 which extend through aligned bores 83 in the linkage arms 22 and into the central retaining block 80. A threaded adapter rod 84 extends from the block 80 through a cylindrical bore (not shown) in the T-shaped member 79.

A cylindrical recess 85 in the retaining block 80 is adapted to receive a vibration-absorbing cushion 90. A nut 86 and a washer 88 secure the cushion 90 in the recess 85. A threaded sleeve 92 retains a similar cushion 94 on the adapter rod 84 against the external surface of the retaining block 80. The cushions may be formed of any suitable vibration-absorbing material known in the art.

A pair of nuts 96 position the adapter rod 84 in the T-shaped member 79 and allow adjustment of the T-shaped member 79 and the adapter plate 76 relative to the linkage arms 22, thus permitting the changing of the attitude of the material compactor 10 and compactor blade 28 for varying ground conditions.

The above arrangement is such that limited movement of the adapter rod 84 within the retaining block is allowed, with the movement being checked by the cushions 90 and 94, thus absorbing shock transmitted to the linkage arms 22 and allowing limited linkage arm movement for conformation of the material compactor 10 to ground level.

Additional shock-absorbing means 98 include an attachment plate 99 bolted to the top of the baseplate 16 on the end of the baseplate 16 nearest the material compactor 10, as illustrated in FIG. 2. The attachment plate 99 mounts a cushion 100 adjacent to an upper plate 102 depending from arms 26 and which is designed to join with the baseplate 16 and the baseplate stop 48 to cushion blows of the lower connecting arms 26 if the compactor 10 disengages the ground during operation.

As shown in FIG. 1, a cylindrical bore 104 is located in the side of the T-shaped member 79 and is adapted to receive a pin 106 secured to the baseplate 16 by a chain 108. The compactor 10 can be lifted upwardly with the connecting arms 24 and 26 making approximately a 45° angle with the ground level, and with the lower connecting arms 26 slightly above the cylindrical hole 104, allowing the pin 106 to be inserted in the hole 104 below one of the lower connecting arms 26. The pin 106 has sufficient length to extend outwardly from the T-shaped member 79 and allow one of the lower connecting arms 26 to rest on the inserted pin 106 so that the compactor 10 is located substantially above the ground level in an elevated position to allow free movement of the retaining vehicle without danger of damaging contact between the compactor and the ground.

I claim:

1. A mounting device for adapting a material compactor to a retaining vehicle comprising, in combination: a baseplate; means for securing the baseplate to the vehicle; a pair of upstanding linkage arms pivotally mounted to the baseplate and upper and lower spaced pairs of connecting arms each having one end pivotally joined to said linkage arms and the other end pivotally connected to a compactor whereby, with the compactor, a parallelogram linkage is provided to allow conformation of the compactor to ground level by vertical movement thereof; means connected between the baseplate and the parallelogram linkage for adjusting the angle between the compactor and the baseplate.

2. A mounting device according to claim 1 wherein said means for securing said baseplate to a vehicle includes vertically spaced elements adapted to engage the upper and lower edges of a dozer blade, and means for adjusting the spacing between said elements so that a compactor may be mounted on vehicles having blades of differing heights.

3. A mounting device according to claim 1 wherein said means for securing said baseplate to a vehicle includes means for selectively adjusting the height of the baseplate with respect to the vehicle on which the same may be mounted.

4. A mounting device for adapting a material compactor to a retaining vehicle comprising, in combination: a baseplate; means for securing the baseplate to the vehicle; a pair of linkage arms pivotally mounted to the baseplate to allow conformation of the compactor to ground level; upper and lower spaced pairs of connecting arms having one end pivotally joined to said linkage arms and the other end pivotally connected to the compactor to allow vertical compactor movement without substantially transmitting reaction to the retaining vehicle; and means on said mounting device for adjusting the angle between the compactor and the base plate and including an adapter plate mounted on the baseplate; a retaining block pivotally joined to the linkage arms intermediate the ends thereof; and an adapter rod extending from said retaining block and adjustably connected to the adapter plate.

5. The combination of claim 4 in which the retaining block includes a cushion mechanism to absorb shock of the linkage arms and allow linkage arm movement to conform to ground level.

6. The combination of claim 4 including means to lock the connecting arms in an ascending configuration relative to said baseplate for vehicle movement with the compactor in an elevated position.

7. A mounting device for adapting a material compactor to a retaining vehicle comprising, in combination: a baseplate; means for securing the baseplate to the vehicle; a pair of parallel linkage arms pivotally mounted to the baseplate on an axis adjacent said securing means to allow the compactor to conform to ground level; upper and lower spaced pairs of connecting arms having one end pivotally joined to said linkage arms and the other end including compactor mounting means comprising pivots, to allow vertical compactor movement without substantially transmitting reaction to the retaining vehicle; means on said mounting device for adjusting the angle between the linkage arms and the baseplate; and shock-absorbing means operatively interposed between the compactor mounting means and said securing means to preclude transmission of shock to the vehicle.

8. The combination of claim 7 in which the securing means includes adjustable means for grasping a dozer blade comprising: a pair of holding rods; a pair of first clamp elements secured to the holding rods for grasping the bottom edge of a dozer blade; and a second pair of clamp elements, adapted to grasp the top edge of a dozer blade, adjustably connected to the holding rods to allow adjustment for different dozer blade heights.

9. The combination of claim 8 in which the securing means includes an adjustable baseplate connection, comprising: a pair of cylindrical bores adapted to movably engage the holding rods; and means to adjustably lock the baseplate connection to the holding rods for vertical adjustment of the material compactor relative to the ground.

10. The combination of claim 8 in which the adjustable baseplate connection includes: a pivotal joint to allow movement of the baseplate; and a stop to confine baseplate movement and hold the material compactor in a tamping position.

* * * * *